(12) United States Patent  
Kwentus et al.

(10) Patent No.: US 8,014,449 B2  
(45) Date of Patent: *Sep. 6, 2011

(54) COMMUNICATIONS SIGNAL TRANSCODER

(75) Inventors: Alan Y. Kwentus, Coto de Caza, CA (US); Charles Alan Brooks, Laguna Beach, CA (US); Steven T. Jaffe, Irvine, CA (US); Stephen Edward Krafft, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/825,893

(22) Filed: Jun. 29, 2010

(65) Prior Publication Data
US 2010/0267330 A1 Oct. 21, 2010

Related U.S. Application Data

(63) Continuation of application No. 10/736,434, filed on Dec. 15, 2003, now Pat. No. 7,751,477.

(60) Provisional application No. 60/447,112, filed on Feb. 13, 2003.

(51) Int. Cl.
H04N 7/12 (2006.01)
(52) U.S. Cl. .................. 375/240.07; 725/111; 714/774
(58) Field of Classification Search ............. 375/240.07, 375/316, 343, 222; 725/111; 714/774
See application file for complete search history.

(56) References Cited

U.S. PATENT DOCUMENTS

| | | | | |
|---|---|---|---|---|
| 5,914,944 A * | 6/1999 | Haugli et al. | ................. | 370/320 |
| 5,915,020 A * | 6/1999 | Tilford et al. | ................ | 455/3.02 |
| 6,829,308 B2 * | 12/2004 | Eroz et al. | ..................... | 375/271 |
| 6,925,285 B2 * | 8/2005 | Kim | ............... | 455/3.02 |
| 6,975,837 B1 * | 12/2005 | Santoru | ........................ | 455/12.1 |
| 6,987,543 B1 * | 1/2006 | Mogre et al. | .................. | 348/608 |

* cited by examiner

*Primary Examiner* — Tung Vo
*Assistant Examiner* — Anner Holder
(74) *Attorney, Agent, or Firm* — Garlick Harrison & Markison; Shayne X. Short

(57) ABSTRACT

Communications signal transcoder. A solution is provided to transcode a signal from a first signal type to a second signal type to ensure proper interfacing between devices that may operate using different signal types. For example, within a communication system, a first signal type (having a first modulation type, e.g., 8 PSK) may be received. The transcoder then ensures that this signal, after it has undergone any initial processing (such as tuning, down-converting, decoding, and so on), is encoded into a second signal type (having a second modulation type, e.g., QPSK) such that it can interface properly with a device for which the received signal is intended. This transcoder functionality may be implemented within discrete components, or it may alternatively be integrated within a functional block of an integrated circuit. This functionality may be implemented in a variety of communication systems including satellite, cable television, Internet, and others.

20 Claims, 12 Drawing Sheets

Fig. 1 satellite communication system alternative satellite communication system cable television communication system cable modem communication system

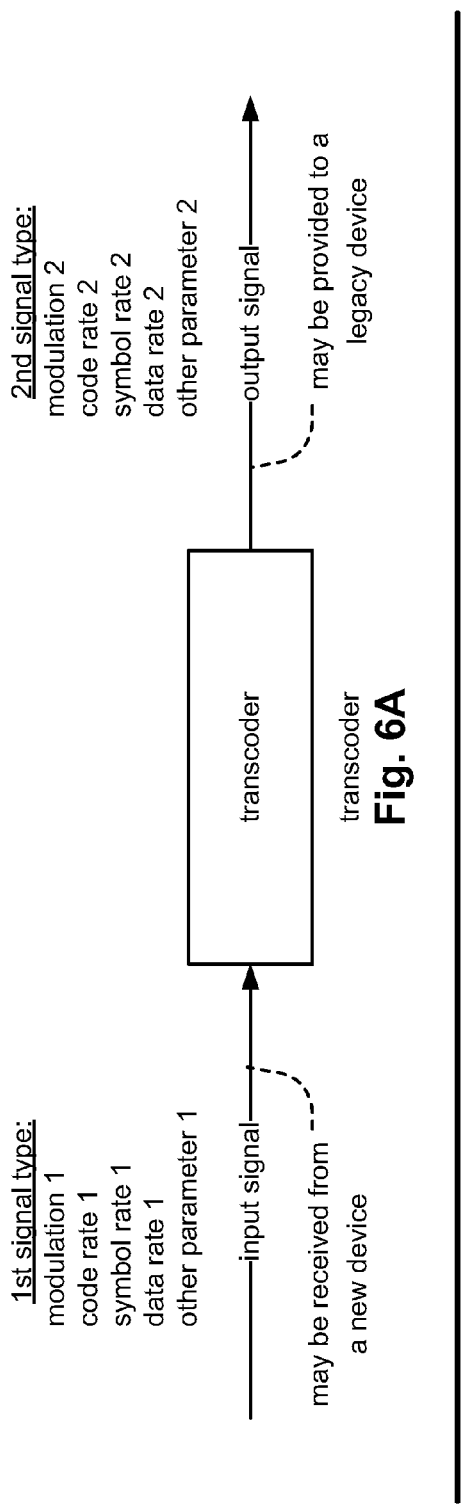
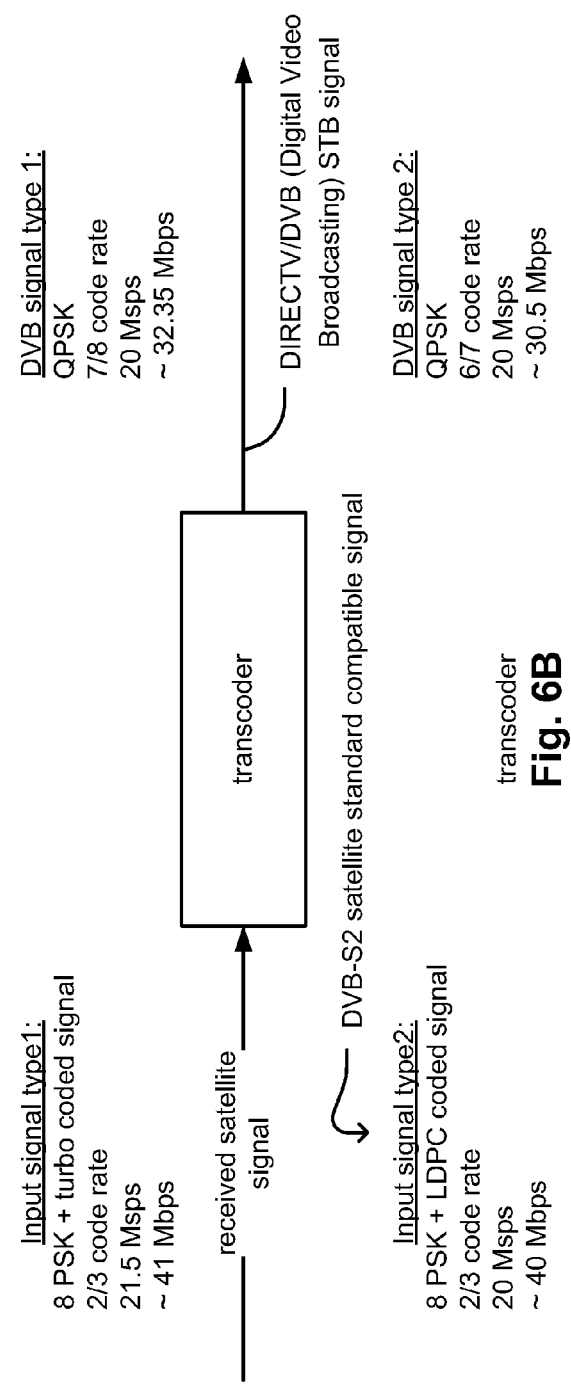

transcoding processing method

COMMUNICATIONS SIGNAL TRANSCODER

CROSS REFERENCE TO RELATED PATENTS/PATENT APPLICATIONS

Continuation Priority claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/736,434, entitled "Communications signal transcoder," filed Dec. 15, 2003, and scheduled to be issued as U.S. Pat. No. 7,751,477 on Jul. 6, 2010, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 60/447,112, entitled "Communications signal transcoder," filed Feb. 13, 2003, now expired.

BACKGROUND OF THE INVENTION

1. Technical Field of the Invention

The invention relates generally to communication systems; and, more particularly, it relates to interfacing between at least two signal types within such communication systems.

2. Description of Related Art

Communication systems have been under continual development for many years. As technology continues to improve, there is a seemingly constant introduction of new technology into the various technology markets. This is true also in the communication system technology space. One problem that may arise when newer technology is introduced into a communication system that also includes older, legacy components is a difficulty in the interfacing of the signals generated by the newer devices with those older, legacy devices that expect signaling in the earlier, legacy signal type format.

This difficulty in performing the interfacing between various signal types can be extremely problematic when a high expenditure is necessary to update a particular technology market to ensure that all devices are operable using the newer signaling. Oftentimes, the economic (and/or logistical) considerations are simply prohibitive to do so. In an effort to combat this, effort is typically focused to ensure that the newer generation devices (and their respective signaling) are backward compatible with the older, legacy devices. However, when there is a relatively significant leap in the technology from the legacy devices to the newer devices, this backward compatibility can often be associated with a loss of performance. The vision of the designers of the legacy devices sometimes cannot adequately design an initial design (which becomes a legacy design) that will accommodate the backward compatibility with newer designs.

Within many communication systems, the increased flow of information, and consequently the increased associated data rates, often require that any interfacing between legacy signaling and newer signaling must be performed extremely efficiently (and sometimes extremely quickly). Many designs do not allow a great deal of processing resources to be allocated to perform this interfacing between legacy and newer devices (including interfacing their respective signaling). As such, there exists a need for an efficient approach that can accommodate the interfacing between legacy and newer technologies.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 6A and FIG. 6B are diagrams illustrating embodiments of transcoders that are built according to the invention.

DETAILED DESCRIPTION OF THE INVENTION

The invention presents a solution to perform the interfacing of a device operating using a first signal type with a device that expects a second signal type. A variety of different communication system embodiments are illustrated herein where such transcoding may be performed. This transcoding may involve the changing of a received signal having a first signal type into an output signal having second signal type. This transcoding may be viewed as being a bridge between two devices that operate using two different signal types. For example, in one situation, a broadcast provider may upgrade its signaling to a new signal type. However, existing receiving devices within the communication system may still be expecting to receive signaling under the older, legacy type of signaling (not the new signal type now provided by the broadcast provider). A great deal of development and resources may have been involved in design of devices at the subscriber end of such communication systems, and there may be a reluctance to change the functionality of those devices given the significant amount of investment already made. The invention provides an effective solution that transcodes a received signal into the format (e.g., signal type) for use by the devices at the subscriber end of the communication system. This way, the legacy devices within the communication system need not be replaced, as they will then still be able to receive signaling (after it has undergone any necessary transcoding) in its older signal type.

The following FIG. 1, FIG. 2, FIG. 3, FIG. 4, and FIG. 5 all illustrate example embodiments of where the functionality of the transcoder of the invention may be implemented. In general, the invention may be extended to support the interfacing between any two devices that operate within different signal spaces.

Figure 1:
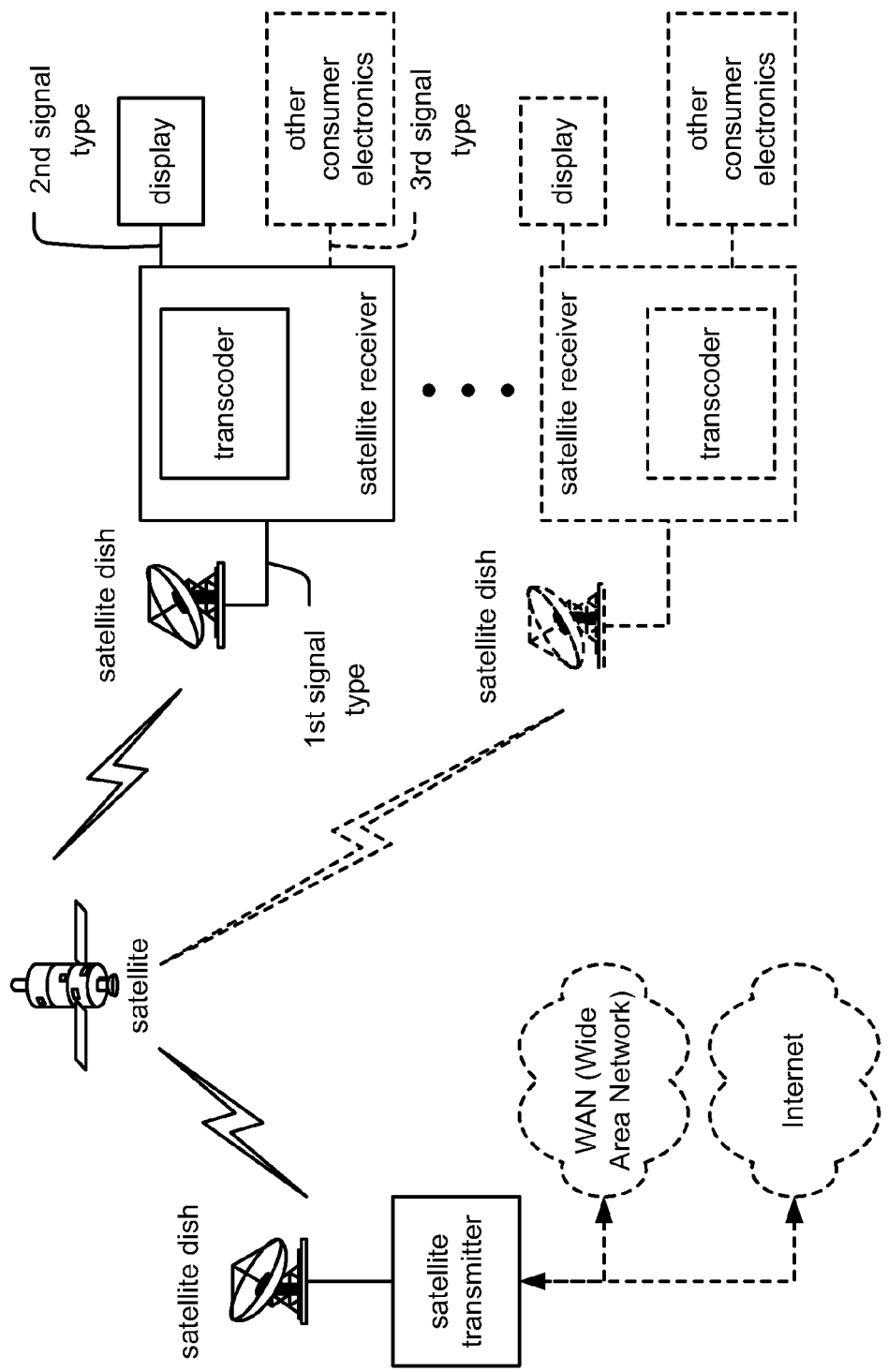
FIG. 1 is a diagram illustrating an embodiment of a satellite communication system that is built according to the invention.

FIG. 1 is a diagram illustrating an embodiment of a satellite communication system that is built according to the invention. A satellite transmitter may include an encoder that encodes information into a $1^{st}$ signal type. The satellite transmitter is communicatively coupled to a satellite dish that is operable to communicate with a satellite. The satellite transmitter may also be communicatively coupled to a wired network. This wired network may include any number of networks including a WAN (Wide Area Network), the Internet, proprietary networks, and other wired networks.

The satellite transmitter employs the satellite dish to communicate to the satellite via a wireless communication channel. The satellite is able to communicate with one or more satellite receivers, each having a respective satellite dish. Each of the satellite receivers may include a decoder to perform decoding of the received signal from the satellite in the $1^{st}$ signal type. These satellite receivers may also be implemented as having a transcoder to perform any interfacing to a device that is communicatively coupled to the satellite receiver. The transcoder can then ensure that the received signal, in its $1^{st}$ signal type, may be properly transformed into a $2^{nd}$ signal type so as to interface with the device.

This device communicatively coupled to the satellite receiver may be a display, an HDTV (High Definition Television) display, or some other consumer electronics without departing from the scope and spirit of the invention. The transcoder will transcode the received signal of the $1^{st}$ signal type into an output signal of a $2^{nd}$ signal type (for use in the device). In some instances, when two or more devices are communicatively coupled to the satellite receiver, the transcoder may transcode the received signal of the $1^{st}$ signal type into one output signal of a $2^{nd}$ signal type (for use by a first device communicatively coupled to the satellite receiver) and also another output signal of a $3^{rd}$ signal type (for use by a second device communicatively coupled to the satellite receiver). In this instance, two or more transcoders may be implemented within the satellite receiver. Alternatively, a single transcoder (e.g., within the satellite receiver) may be designed to perform the transcoding of the received signal of the $1^{st}$ signal type into one output signal of a $2^{nd}$ signal type and also into another output signal of a $3^{rd}$ signal type, either simultaneously (in parallel) or sequentially (in series).

In this embodiment, the communication to and from the satellite may cooperatively be viewed as being a wireless communication channel, or each of the communication to and from the satellite may be viewed as being two distinct wireless communication channels.

For example, the wireless communication "channel" may be viewed as not including multiple wireless hops in one embodiment. In other embodiments, the satellite receives a signal received from the satellite transmitter (via its satellite dish), amplifies it, and relays it to the satellite receivers (via their respective satellite dishes); the satellite receivers may also be implemented using terrestrial receivers such as satellite receivers, satellite based telephones, and satellite based Internet receivers, among other receiver types. In the case where the satellite receives a signal received from the satellite transmitter (via its satellite dish), amplifies it, and relays it, the satellite may be viewed as being a "transponder." In addition, other satellites may exist that perform both receiver and transmitter operations in cooperation with the satellite. In this case, each leg of an up-down transmission via the wireless communication channel would be considered separately.

In whichever embodiment, the satellite communicates with the satellite receiver. The satellite receiver may be viewed as being a mobile unit in certain embodiments (employing a local antenna); alternatively, the satellite receiver may be viewed as being a satellite earth station that may be communicatively coupled to a wired network in a similar manner in which the satellite transmitter may be communicatively coupled to a wired network.

Figure 2:
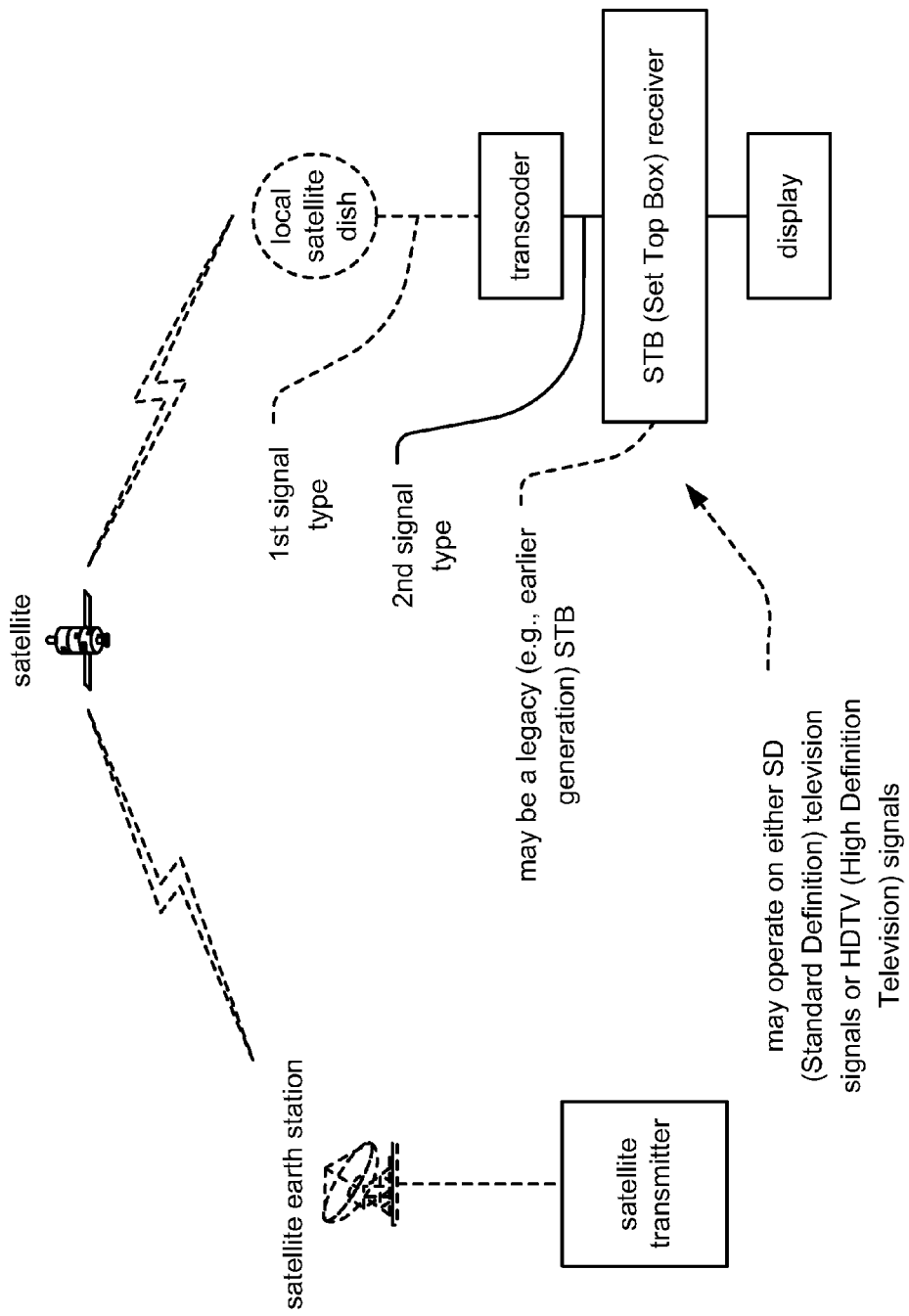
FIG. 2 is a diagram illustrating an alternative embodiment of a satellite communication system that is built according to the invention.

FIG. 2 is a diagram illustrating an alternative embodiment of a satellite communication system that is built according to the invention. This embodiment is somewhat similar to the embodiment described above.

For example, a satellite transmitter may include an encoder that encodes information into a $1^{st}$ signal type. The satellite transmitter is communicatively coupled to a satellite dish that is operable to communicate with a satellite. Also similar to the embodiment described above, the satellite transmitter of this alternative embodiment may also be communicatively coupled to a wired network. This wired network may include any number of networks including a WAN, the Internet, proprietary networks, and other wired networks.

The satellite transmitter employs the satellite dish to communicate to the satellite via a wireless communication channel. Shown in this embodiment, the satellite is able to communicate with a STB (Set Top Box) receiver that has a local satellite dish. Interposed between the local satellite dish and the STB receiver is a transcoder that is operable to transform the signal received from the local satellite dish (being shown as being in a $1^{st}$ signal type) into a signal that is provided to a STB receiver (being shown as being in a $2^{nd}$ signal type). In some instances, the STB receiver may be viewed as being a legacy (e.g., earlier generation) type STB receiver that is compatible to operate on earlier signal types. The transcoder is operable to ensure that the signal provided to the STB receiver is of a signal type that the STB receiver expects to receive.

The STB receiver may be communicatively coupled to the display that is operable to display and output the appropriately decoded audio and video signals output from the STB receiver. The receiver end devices in this embodiment (e.g., the transcoder, the STB receiver, and the display) may all be implemented to operate on signals of one or both of SD (Standard Definition) television signals or HDTV (High Definition Television) signals without departing from the scope and spirit of the invention. In general, the transcoder is operable to transcode the received signal of the $1^{st}$ signal type into an output signal of a $2^{nd}$ signal type (for use in the STB receiver to perform appropriate demodulation and/or decoding as appropriately needed and required).

Figure 3:
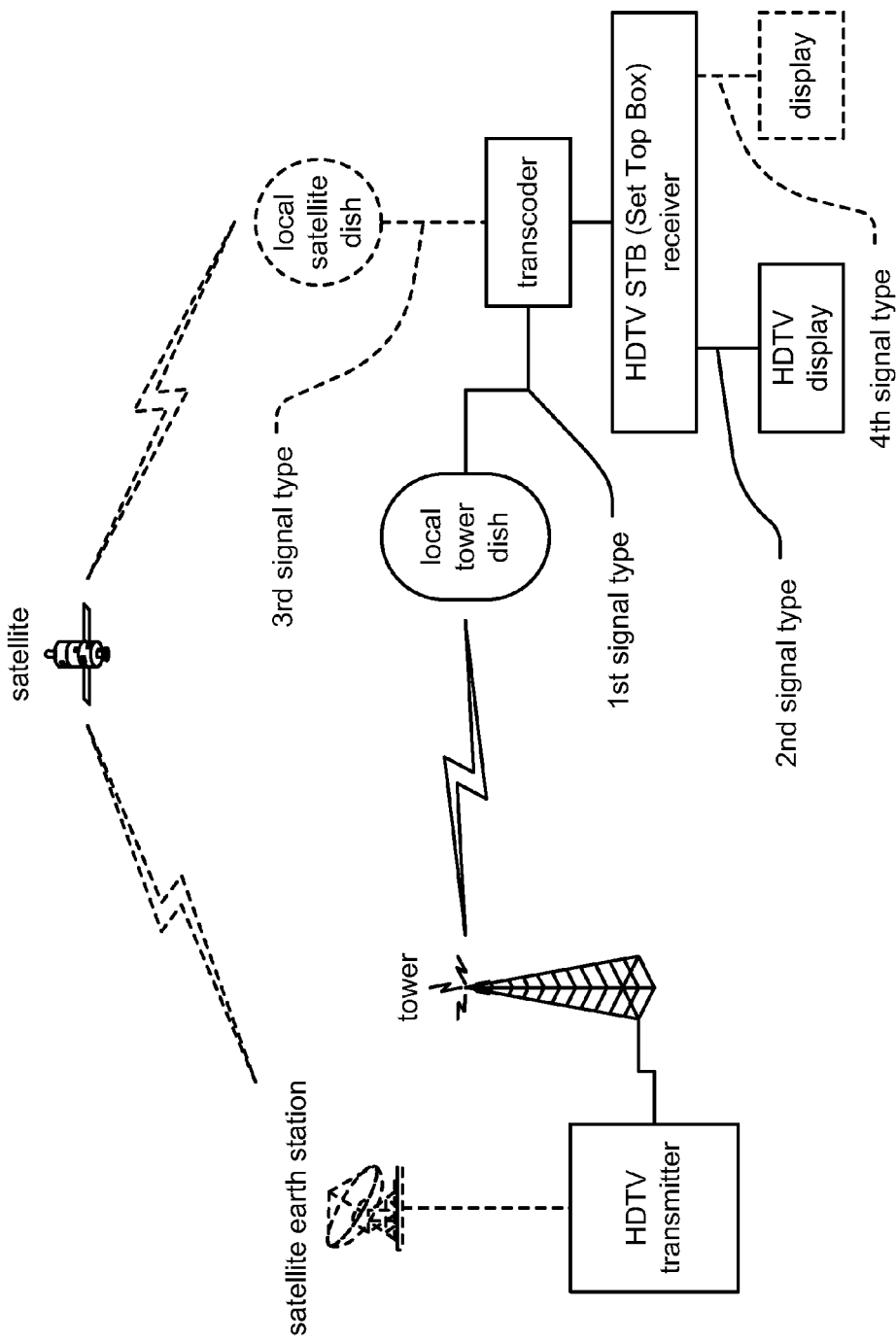
FIG. 3 is a diagram illustrating an embodiment of a HDTV (High Definition Television) communication system that is built according to the invention.

FIG. 3 is a diagram illustrating an embodiment of a HDTV (High Definition Television) communication system that is built according to the invention. An HDTV transmitter is communicatively coupled to a tower. The HDTV transmitter, using its tower, transmits a signal to a local tower dish via a wireless communication channel. The local tower dish may communicatively couple to an HDTV STB (Set Top Box) receiver via a coaxial cable. The HDTV STB receiver includes the functionality to receive the wireless transmitted signal that has been received by the local tower dish; this may include any transformation and/or down-converting that may be needed to accommodate any up-converting that may have been performed before and during transmission of the signal from the HDTV transmitter and its tower.

To perform any interfacing from the signal type received by the HDTV STB receiver, a transcoder is interposed between the local tower dish the HDTV STB receiver. The transcoder is operable to change the signal type of a signal received by the local tower dish (being of a $1^{st}$ signal type) to that of a $2^{nd}$ signal type. This operation performed by the transcoder ensures that the signal type of the received signal (again, being of the $1^{st}$ signal type as received by the local tower dish) is properly transformed to a $2^{nd}$ signal type into an appropriate form as is be expected to be received by the HDTV STB.

For example, the HDTV STB receiver may be communicatively coupled to an HDTV display that is able to display the demodulated and decoded wireless transmitted signals received by the HDTV STB receiver and its local tower dish. There may be instances when the HDTV STB receiver receives a signal in a format (e.g., the $1^{st}$ signal type) that is incompatible with the HDTV display. In this instance, the transcoder will then transform the received signal of the $1^{st}$ signal type to a signal of the $2^{nd}$ signal type. In addition, the HDTV STB receiver may also be communicatively coupled to another type of display (that is not necessarily an HDTV display). This display may be an older, legacy type of display. There may be instances where it is desirable to be able to provide an output signal from the HDTV STB receiver to this other type of display (while also providing the functionality to support HDTV displays, when desired by a user). There may be instances where the other display requires a signal in a format different than that required by the HDTV display. In this instance, the transcoder may also be operable to transform the $1^{st}$ signal type to a signal of a $4^{th}$ signal type (as being compatible with the other type of display). Alternatively, two separate transcoders, in a distributed implementation may also be employed: one transcoder being operable to transform the $1^{st}$ signal type to a signal of the $2^{nd}$ signal type, and the other transcoder being operable to transform the $1^{st}$ signal type to a signal of the $4^{th}$ signal type.

Referring to the functionality of the communication herein, the HDTV transmitter (via its tower) transmits a signal directly to the local tower dish via the wireless communication channel in this embodiment. In alternative embodiments, the HDTV transmitter may first receive a signal from a satellite, using a satellite earth station that is communicatively coupled to the HDTV transmitter, and then transmit this received signal to the local tower dish via the wireless communication channel. In this situation, the HDTV transmitter operates as a relaying element to transfer a signal originally provided by the satellite that is destined for the HDTV STB receiver. For example, another satellite earth station may first transmit a signal to the satellite from another location, and the satellite may relay this signal to the satellite earth station that is communicatively coupled to the HDTV transmitter. The HDTV transmitter performs receiver functionality and then transmits its received signal to the local tower dish.

In even other embodiments, the HDTV transmitter employs its satellite earth station to communicate to the satellite via a wireless communication channel. The satellite is able to communicate with a local satellite dish; the local satellite dish communicatively couples to the HDTV STB receiver via a coaxial cable. This path of transmission shows yet another communication path where the HDTV STB receiver may communicate with the HDTV transmitter. The type of signal received by the HDTV STB receiver via this local satellite dish may be viewed as being a $3^{rd}$ signal type. For example, some transformations may have been made to the signal provided from the HDTV transmitter (via its satellite earth station), via the satellite, to the local satellite dish of the HDTV STB receiver. When necessary, the transcoder may also be operable to transform this $3^{rd}$ signal type to a signal of either one or both of the $2^{nd}$ signal type of the $4^{th}$ signal type (as being compatible with the HDTV display and the other type of display, respectively). In whichever embodiment and whichever signal path the HDTV transmitter employs to communicate with the HDTV STB receiver, the HDTV STB receiver is operable to receive communication transmissions from the HDTV transmitter.

The HDTV transmitter is operable to encode information (using an encoder) that is to be transmitted to the HDTV STB receiver; the HDTV STB receiver is operable to decode the transmitted signal (using a decoder). The output of this decoder, within the HDTV STB receiver will correspond to either one of the $1^{st}$ signal type and the $3^{rd}$ signal type, depending on the path of transmission. The transcoder is then operable to transform either the $1^{st}$ signal type signal of the $3^{rd}$ signal type to a signal of either one or both of the $2^{nd}$ signal type and the $4^{th}$ signal type.

Figure 4:
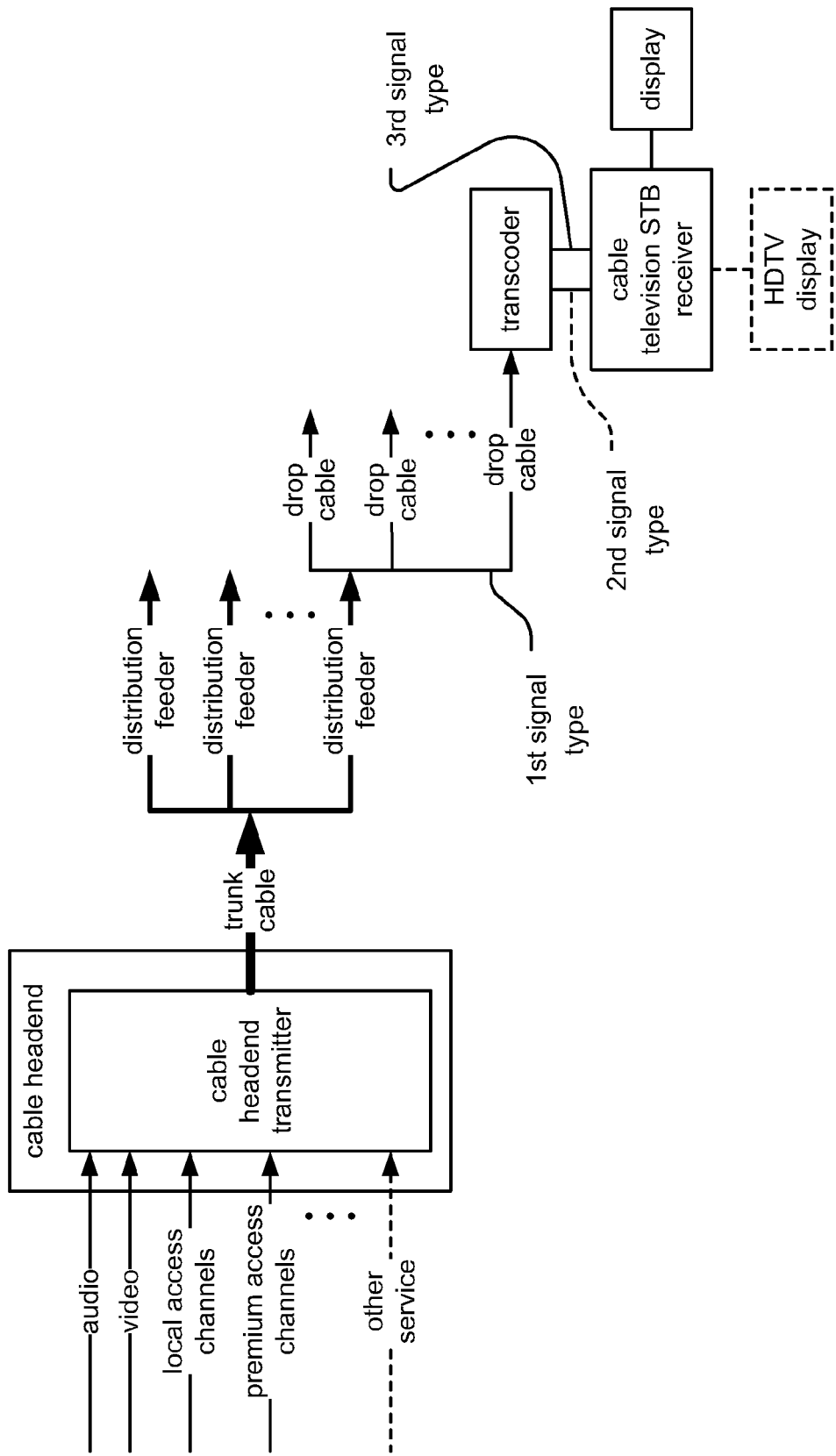
FIG. 4 is a diagram illustrating an embodiment of a cable television communication system that is built according to the invention.

FIG. 4 is a diagram illustrating an embodiment of a cable television communication system that is built according to the invention. Signals from various sources (including broadcast transmissions, satellite-delivered programming, local television productions [local access channels], and/or cable subscriber service productions [premium access channels]) are received and processed at the cable headend within the cable television communication system. A cable headend transmitter then transmits the information across the communication medium downstream to subscribers on those services. Television signals are electromagnetic impulses or waves that take up space in the "frequency spectrum." They require some medium through which to travel, or propagate. Broadcast television transmissions travel through the air at various frequencies, and television signals carried on a cable system travel through a special type of cable. Signals can travel through metal wires such as coaxial cable. Each television signal travels on a different frequency inside the cable, and so coaxial cable acts as a self-contained spectrum. In effect, the cable industry creates its own spectrum—and thereby enables households that cannot or choose not to receive over-the-air transmissions to receive television. The cable operator receives a variety of different programs from satellite and broadcast signals, and re-transmits those signals through coaxial cable and/or optical fiber to customers' homes.

Generally, a large "trunk" cable carries the signals down through the center of a town or other subscriber population or group. The distribution feeder cables, which are of smaller diameter, connect to the trunk cable and branch off into local neighborhoods. When a customer purchases cable services, the cable operator runs a smaller "drop" cable [drop cable] from the distribution feeder cable directly into the customer's home, where it is attached to a display device (such as a television, display, or an HDTV display). Sometimes, the television, VCR (Video Cassette Recorder), or other tuning device to which the drop is communicatively coupled is not capable to tune all the channels of interest (e.g., because it is not "cable compatible,") then a cable television STB receiver (sometimes referred to as a converter) may be placed between the cable and the display device, television, VCR, or other tuning device. This system design, or "architecture" is known as a "tree and branch" design. The tree and branch architecture is the most efficient, economical method to transmit a package of multiple channels of programming from a headend to all customers. This design will operate when the display device (or HDTV display) is compatible to receive signaling of the type received via the drop cable.

However, when the signaling provided from the cable headend is changed, then the user-end (the display and/or the cable television STB receiver) may be incompatible with the new signal type. In order to ensure that the signaling provided from the cable headend may properly be used by the user, a transcoder may be implemented within the cable television STB receiver. The transcoder will then transform the received signal of the $1^{st}$ signal type to a signal of a $2^{nd}$ signal type for use by a device communicatively coupled to the cable television STB receiver. For example, the transcoder is operable to transform the received signal of the $1^{st}$ signal type to a signal of a $2^{nd}$ signal type for use by an HDTV display. Alternatively, the transcoder is operable to transform the received signal of the $1^{st}$ signal type to a signal of a $3^{rd}$ signal type for use by a display (that is not an HDTV display). Some other type of consumer electronics device may also be communicatively coupled to the cable television STB receiver, and the transcoder is then operable to transform the received signal of the $1^{st}$ signal type to a signal of that signal type for use by the consumer electronics device.

Figure 5:
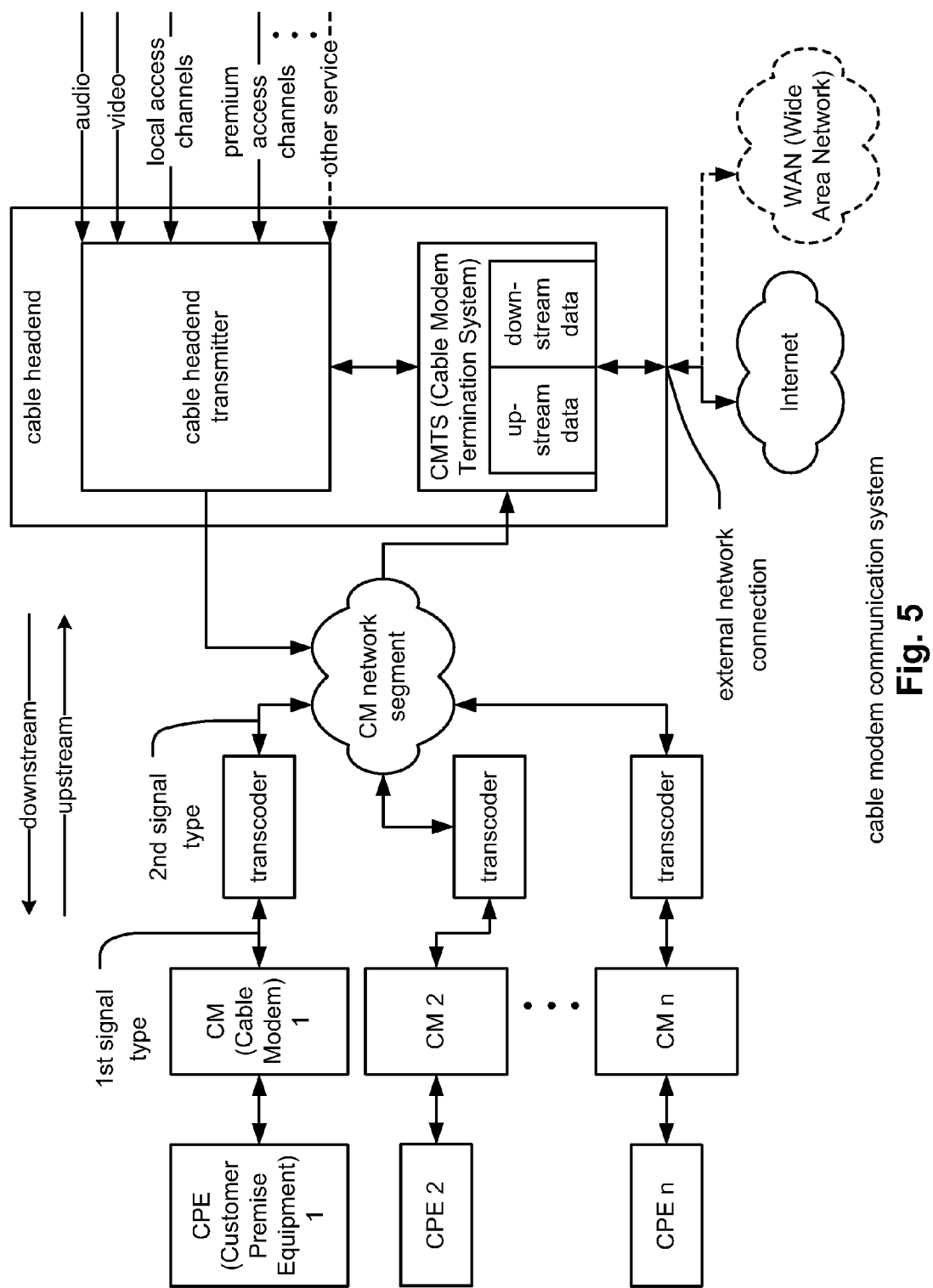
FIG. 5 is a diagram illustrating an embodiment of a cable modem communication system that is built according to the invention.

FIG. 5 is a diagram illustrating an embodiment of a cable modem communication system that is built according to the invention. The cable modem communication system includes a number of CMs (Cable Modems) that may be used by different users (the CMs shown as a CM 1, a CM 2, . . . , and a CM n) and a cable headend that includes a Cable Modem Termination System (CMTS) and a cable headend transmitter. The CMTS is a component that exchanges digital signals with CMs on a cable network.

Each of the CMs (shown as CM 1, CM 2, . . . , and CM n) is operable to communicatively couple to a Cable Modem (CM) network segment. A number of elements may be included within the CM network segment. For example, routers, splitters, couplers, relays, and amplifiers may be contained within the CM network segment without departing from the scope and spirit of the invention.

The CM network segment allows communicative coupling between any one of the CMs and a cable headend that includes the cable modem headend transmitter and the CMTS. The CMTS may be located at a local office of a cable television company or at another location within a cable modem communication system. The cable headend transmitter is able to provide a number of services including those of audio, video, local access channels, premium access channels, as well as any other service known in the art of cable systems. Each of these services may be provided to the one or more CMs (shown as a CM 1, CM 2, . . . , and CM n).

In addition, through the CMTS, the CMs are able to transmit and receive data from the Internet and/or any other network to which the CMTS is communicatively coupled via an external network connection. The operation of a CMTS, at the cable-provider's head-end, may be viewed as providing analogous functions that are provided by a Digital Subscriber Line Access Multiplexor (DSLAM) within a digital subscriber line (DSL) system. The CMTS takes the traffic coming in from a group of customers on a single channel and routes it to an Internet Service Provider (ISP) for connection to the Internet, as shown via the external network connection that communicatively couples to the Internet access. At the cable headend, the cable providers will have space, or lease space for a third-party ISP to have, servers for accounting and logging, Dynamic Host Configuration Protocol (DHCP) for assigning and administering the Internet Protocol (IP) addresses of all the cable system's users (specifically, for the CM 1, CM 2, . . . , and CM n), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to any one or more of the connected CMs (shown as the CM 1, CM 2, . . . , and CM n). The individual network connection, within the CM network segment, decides whether a particular block of data is intended for that particular CM or not. On the upstream side, information is sent from the CMs (shown as the CM 1, CM 2, . . . , and CM n) to the CMTS; on this upstream transmission, the CMs (shown as the CM 1, CM 2, . . . , and CM n) to which the data is not intended do not see that data at all.

As an example of the capabilities provided by a CMTS, the CMTS will enable as many as 1,000 users to connect to the Internet through a single 6 MHz channel. Since a single channel is capable of 30-40 Mbps (mega-bits per second) of total throughput, this means that users may see far better performance than is available with standard dial-up modems (operating over telephone lines) that may be used to access external networks such as the Internet.

Each of the CMs (CM 1, CM 2, . . . , and CM n) may be communicatively coupled to one or more CPEs (Customer Premise Equipment devices). Any one of the CPEs may be a computer, desk-top computer, lap-top computer, other Internet operable appliance, or some other type of CPE that is operable to interact with the Internet (or some other WAN that is accessible via the CM network segment).

In this embodiment, transcoders may be interposed between the CM network segment and the respective CMs to ensure proper transformation, when necessary, between the signaling provided to/from the CMs and the cable headend. For example, when one of the CPEs wished to transmit data upstream to the cable headend, then the signaling provided from the CPE may be of a $1^{st}$ signal type, and the cable headend may expect signaling of a $2^{nd}$ signal type. A transcoder within the CM would then transform this information from the $1^{st}$ signal type to that of the $2^{nd}$ signal type for proper interfacing to the CM network segment. In addition, the signaling provided to the CMs may be a $1^{st}$ signal type and the CMs themselves may be expecting signaling of a $2^{nd}$ signal type; in such an instance, the transcoders are then operable to perform the appropriate signal transformation to ensure that the signaling provided is in an appropriate form that the respective CMs expect to receive.

In addition, the transcoder is may be implemented to perform the reverse transformation of a signal sent from the cable headend to one of the CMs (e.g., transform this information from the $2^{nd}$ signal type to that of the $1^{st}$ signal type).

FIG. 6A and FIG. 6B are diagrams illustrating embodiments of transcoders that are built according to the invention.

Referring to the FIG. 6A, a transcoder is operable to transform an input signal of a $1^{st}$ signal type into an output signal of a $2^{nd}$ signal type. The input signal may be a decoded signal provided by a decoder, receiver, and/or transport processor.

The output signal may be a signal that is subsequently provided, as an input signal, to a device that expects a signal of the $2^{nd}$ signal type.

In some instances, the input signal may be viewed as being a signal provided from a new device, and the output signal may be viewed as a signal being provided to an older, legacy device. For example, the new device providing the input signal may be an upgraded broadcast transmitter, and the legacy device receiving the output signal may be a legacy type STB receiver that expects to receive signal types of an earlier type.

A variety of parameters of the input and output signals (or the $1^{st}$ signal type and the $2^{nd}$ signal type) may be used to characterize the signal type. For example, the signal type may refer to the type of modulation of the signal. In the turbo code context, the signal type may refer to the code rate of the signal. Alternatively, the signal type may refer to the symbol rate and/or the data rate of the signal. In addition, other parameters may be used to distinguish the $1^{st}$ signal type from the $2^{nd}$ signal type. The functionality of the transcoder, at a very minimum, may be viewed as performing the transformation of the input signal (having any one or more of these parameters enumerated above) into the output signal (having a modified characteristic of any one or more of these parameters enumerated above). A specific example of the functionality of the transcoder is presented below with respect to FIG. 6B.

Referring to the FIG. 6B, a transcoder is operable to transform a received satellite signal into a DIRECTV and/or a DVB (Digital Video Broadcasting) STB (Set Top Box) compatible signal. More specifically, the received satellite signal (e.g., the input signal) may be an input signal type 1 that has been encoded using turbo encoding. This input signal type 1 includes a modulation type of 8 PSK (Phase Shift Keying), a code rate of ⅔, a symbol rate of 21.5 Msps (Mega-symbols per second), and a data rate of approximately 41 Mbps (Megabit per second). The output signal may be a DVB signal type 1 that includes a modulation type of QPSK (Quadrature Phase Shift Keying), a code rate of ⅞, a symbol rate of 20 Msps, and a data rate of approximately 32.25 Mbps.

Alternatively, the received satellite signal (e.g., the input signal) may be an input signal type 2 that has been encoded using LDPC (Low Density Parity Check) encoding such that the input signal type 2 is compatible with the next-generation satellite digital video broadcasting standard, DVB-S2. This input signal type 2, being compatible with DVB-S2, includes a modulation type of 8 PSK and a code rate of ⅔, a symbol rate of 20 Msps, and a data rate of approximately 40 Mbps. The output signal may be a DVB signal type 2 that includes a modulation type of QPSK, a code rate of 6/7, a symbol rate of 20 Msps, and a data rate of approximately 30.5 Mbps.

Clearly, these two particular examples of signal transcoding shown within the FIG. 6B are exemplary and are not meant to be exhaustive of the manner and types of signal transcoding that may be performed in accordance with the invention without departing from the scope and spirit thereof.

The following FIG. 7A, FIG. 7B, FIG. 7C, and FIG. 7D illustrate some of the various embodiments in which a transcoder may be implemented according to the invention.

Figure 7A:
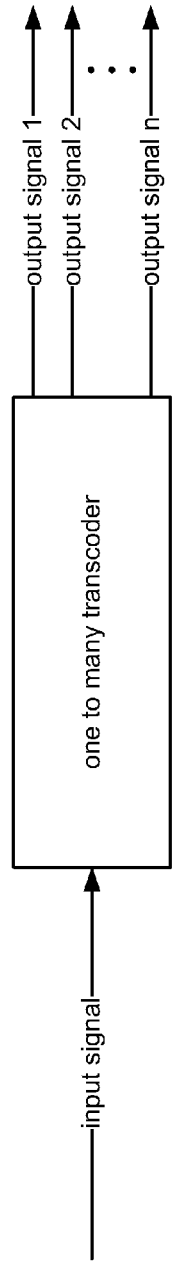
FIG. 7A and FIG. 7B are diagrams illustrating embodiments of one to many transcoders that are built according to the invention.
Figure 7B:
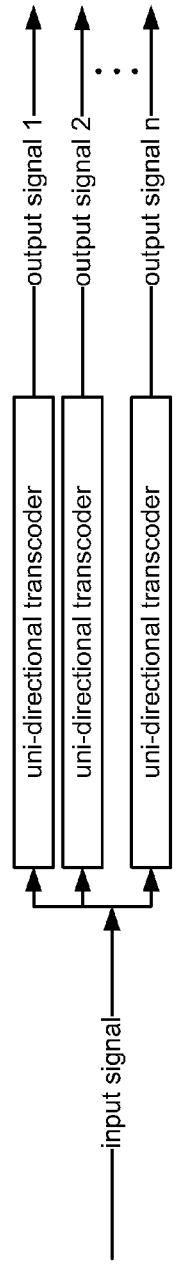

FIG. 7A and FIG. 7B are diagrams illustrating embodiments of one to many transcoders that are built according to the invention.

Referring to the FIG. 7A, an input signal is provided to a transcoder that is operable to transform the input signal of a $1^{st}$ signal type to an output signal 1 (having a $2^{nd}$ signal type). In addition, the transcoder is operable to transform the input signal of a $1^{st}$ signal type to an output signal 2 (having a $3^{rd}$ signal type). Additional output signals may also be generated by the transcoder, as shown when the transcoder transforms the input signal of a $1^{st}$ signal type to an output signal n (having an $(n+1)^{th}$ signal type).

The transcoder itself may support this functionality in a variety of ways. For example, the transcoder may be an integrated device that includes multiple functional blocks therein to support the transformation of the input signal into the various output signals 1, 2, . . . , n. These various functional blocks may operate simultaneously (in a parallel operation) to perform the respective transformations. Alternatively, a single transcoder functional block may be employed sequentially (in serial operation) performs the respective transformations.

In even another alternative embodiment, the transcoder may be implemented using discrete components that each supports the functionality of a uni-directional transcoder. A more detailed description of this embodiment is described with respect to FIG. 7B.

Referring to the FIG. 7B, from a higher level viewpoint, the input and output of the one to many transcoder of the FIG. 7B is analogous to that of the FIG. 7A. However, an array of uni-directional transcoders is employed to perform the individual transformations of the input signal into the output signal 1, 2, . . . n.

Figure 7C:
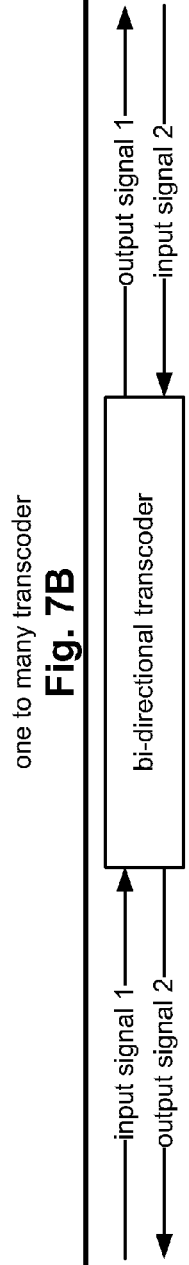
FIG. 7C and FIG. 7D are diagrams illustrating embodiments of bi-directional transcoders that are built according to the invention.
Figure 7D:
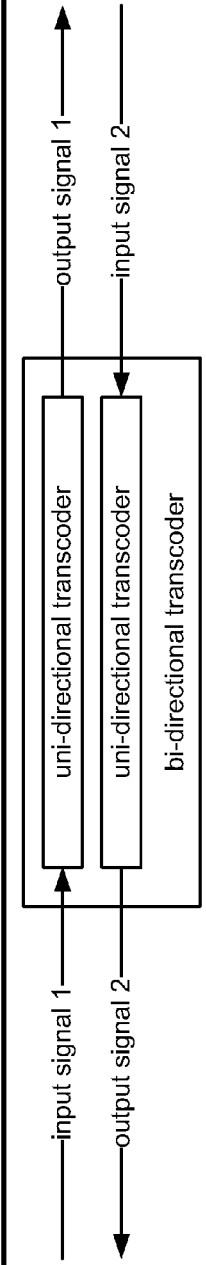

FIG. 7C and FIG. 7D are diagrams illustrating embodiments of bi-directional transcoders that are built according to the invention.

Referring to the FIG. 7C, a bi-directional transcoder is operable to transform an input signal 1 of a $1^{st}$ signal type into an output signal 1 of a $2^{nd}$ signal type. In addition, the bi-directional transcoder is operable to transform an input signal 2 of a $3^{rd}$ signal type into an output signal 2 of a $4^{th}$ signal type.

Similar to the different possible embodiments described above with respect to the one to many transcoders, the bi-directional transcoder here may also be implemented in a number of ways. For example, the transcoder may be an integrated device that includes multiple functional blocks therein to support the transformation of the input signals 1 and 2 into the output signals 1 and 2, respectively. These various functional blocks may operate simultaneously (in a parallel operation) to perform the respective transformations. Alternatively, a single transcoder functional block may be employed that sequentially (in serial operation) to perform the respective transformations.

Referring to the FIG. 7D, the bi-directional transcoder is implemented using two discrete uni-directional functional blocks. From a higher level viewpoint, the input and output of the bi-directional transcoder of the FIG. 7D is analogous to that of the FIG. 7C. More specifically, a uni-directional transcoder is operable to transform an input signal 1 of a $1^{st}$ signal type into an output signal 1 of a $2^{nd}$ signal type. In addition, another uni-directional transcoder is operable to transform an input signal 2 of a $3^{rd}$ signal type into an output signal 2 of a $4^{th}$ signal type.

Figure 8:
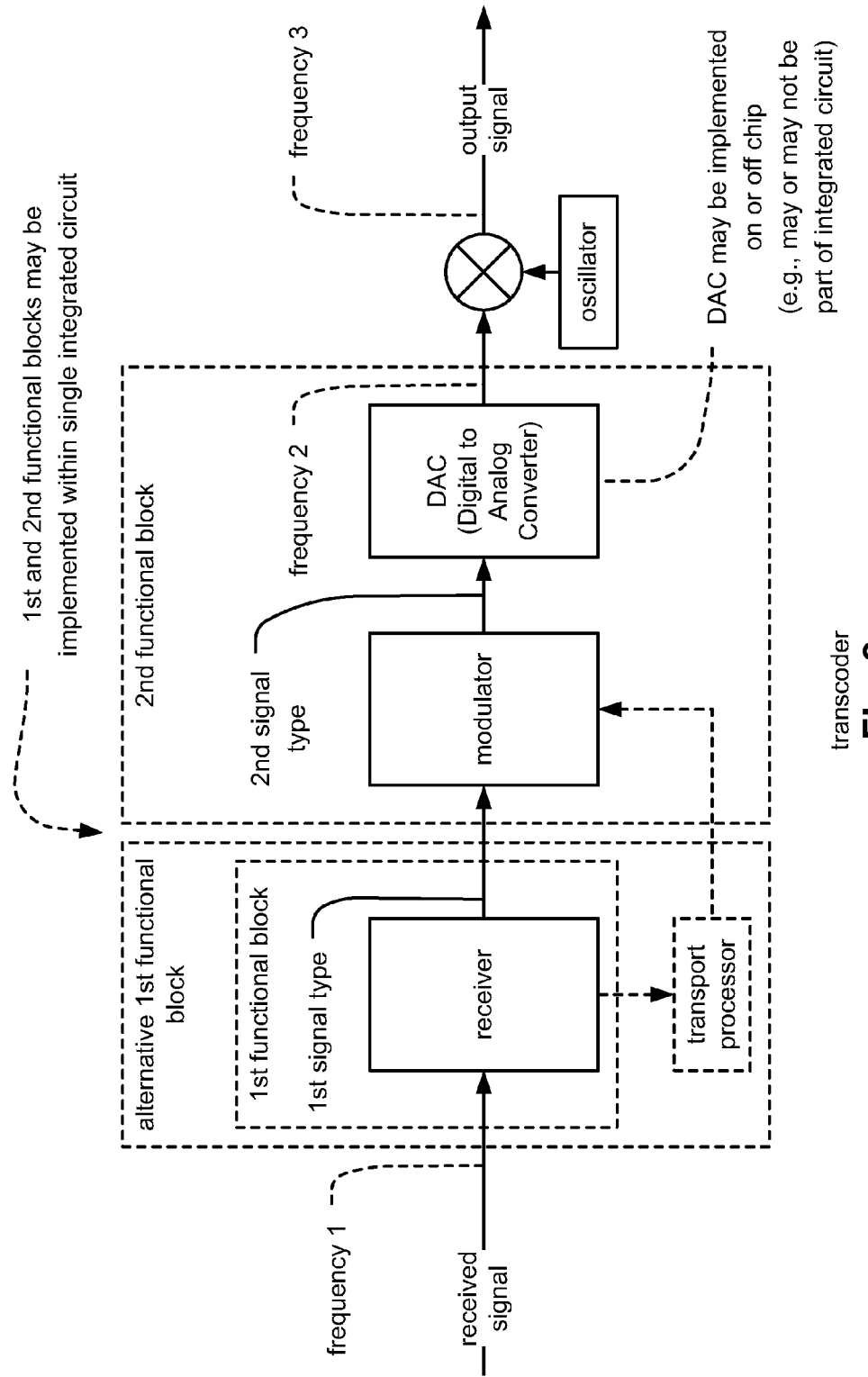
FIG. 8 is a diagram illustrating an embodiment of a transcoder that is built according to the invention.

FIG. 8 is a diagram illustrating an embodiment of a transcoder that is built according to the invention.

Referring to the FIG. 8, a received signal having a frequency 1 is provided to a receiver. This receiver may perform any necessary tuning, down-converting, decoding, and/or pre-processing to decode the received signal. The output of the receiver may be viewed as a signal having a $1^{st}$ signal type. The output of the receiver is provided to a modulator (of the transcoder) that operates according to the invention. In certain embodiments, a transport processor is interposed between the receiver and the modulator. The modulator (again, of the transcoder) is operable to transform the signal, from the receiver (or the transport processor) having the $1^{st}$ signal type into a signal having a $2^{nd}$ signal type. The functionality supported by the receiver may be viewed as being within a $1^{st}$ functional block, and the functionality supported by both the receiver and the transport processor may be viewed as being within an alternative $1^{st}$ functional block. The functionality supported by the modulator in combination with the DAC may be viewed as being within a $2^{nd}$ functional block.

In this embodiment, the signal having the $2^{nd}$ signal type is then provided to a DAC (Digital to Analog Converter). This DAC may be implemented as part of a single integrated circuit in which the functionality shown herein is includes; alternatively, the DAC may be implemented off-chip (e.g., in a separate integrated circuit). In whichever way a particular embodiment may be implemented, the functionality described by the various functional blocks is performed. This now analog version of the signal having the $2^{nd}$ signal type may then be up-converted in frequency from a frequency 2 to a frequency 3 (using an oscillator) before being provided as an output signal. This embodiment shows the operation of one embodiment of a transcoder, built according to the invention, in the context of a receiver's functionality and any necessary DAC operation and/or up-converting (or down-converting for that matter) before providing the signal having the $2^{nd}$ signal type as output.

Figure 9:
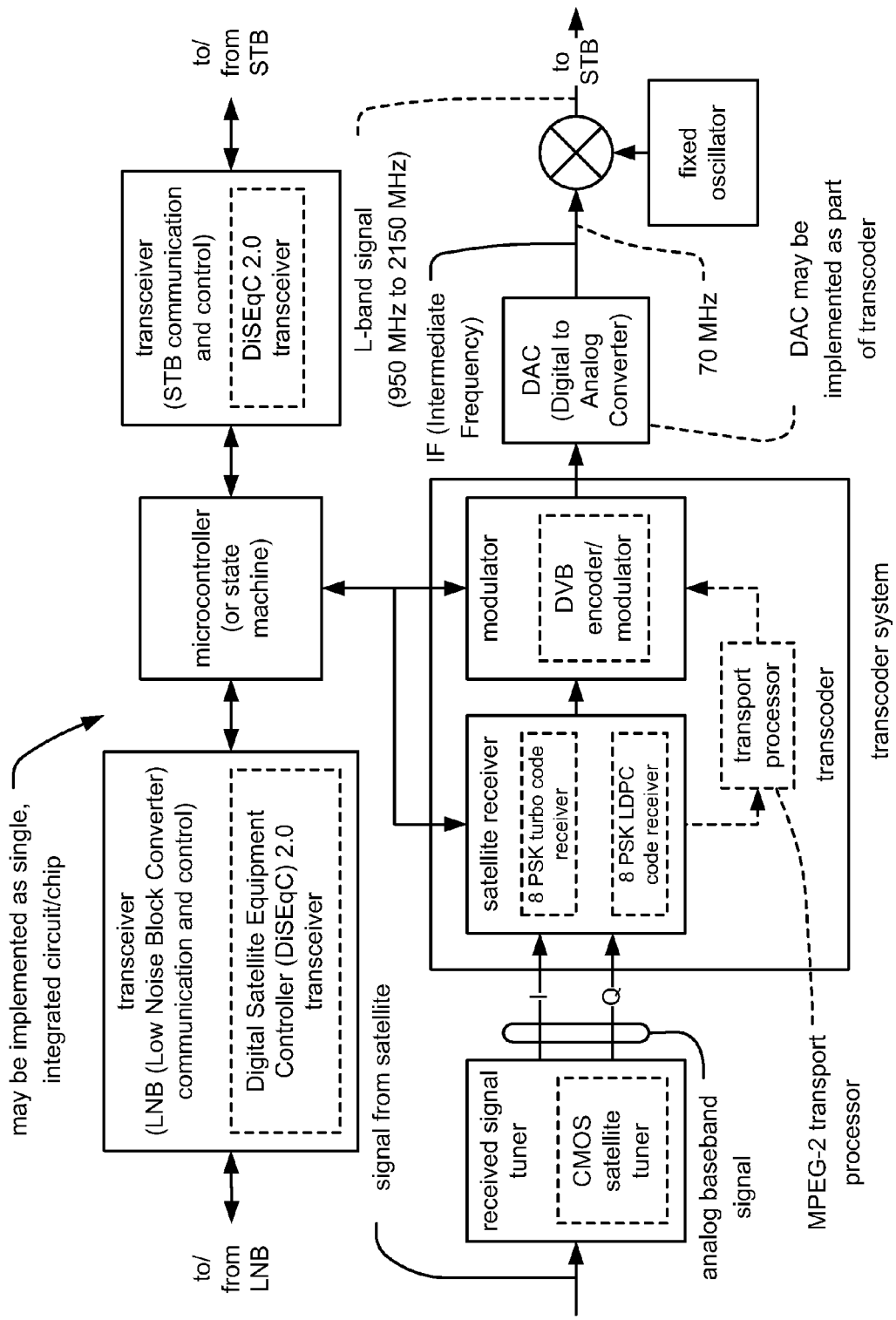
FIG. 9 is a diagram illustrating embodiments of a transcoder system that is built according to the invention.

FIG. 9 is a diagram illustrating embodiments of a transcoder system that is built according to the invention. Referring to the FIG. 9, a signal is received from a satellite. This signal may be viewed as a raw signal provided from a satellite dish. This signal received from the satellite is provided to a received signal tuner. The received signal tuner may be implemented as a CMOS (Complementary Metal Oxide Semiconductor) satellite tuner in some embodiments. The CMOS satellite tuner is operable to perform tuning and/or down-converting to generate an analog baseband signal, including the I, Q (In-phase, Quadrature components) thereof. This analog baseband signal is provided to a satellite receiver. The satellite receiver may be implemented specifically as an 8 PSK turbo code receiver in some embodiments. For example, the satellite receiver may be designed to operate on an expected received signal having a modulation type of 8 PSK, and being a turbo coded signal. In certain embodiments, the signal received by the 8 PSK turbo code receiver may be of the type of input signal 1 described above with respect to FIG. 6B.

Alternatively, the satellite receiver may be implemented specifically as an 8 PSK LDPC (Low Density Parity Check) code receiver in other embodiments. For example, the satellite receiver may be designed to operate on an expected received signal having a modulation type of 8 PSK, and being an LDPC coded signal. In some embodiments, the signal received by an 8 PSK LDPC code receiver may be of the type of input signal 2 that is also described above with respect to FIG. 6B.

It is also noted that a single satellite receiver may also be implemented to perform the receiver functionality of both an 8 PSK turbo code receiver and an 8 PSK LDPC code receiver. The selection of which functionality is used at any given time may be selected by a user of the device or adaptively in real time based on the characteristics of the received satellite signal.

Regardless of which type of signal is received within the communication system, and regardless of in which manner the satellite receiver is implemented, the output of the satellite receiver is provided to a modulator that is built according to the invention.

If desired, a transport processor, which may be implemented as an MPEG-2 (Motion Picture Expert Group, level 2) transport processor, may be interposed between the satellite receiver and the transcoder. One possible embodiment of the transport processor is described in more detail below with respect to FIG. 10.

The modulator is operable to transform the signal provided by the satellite receiver (or the transport processor that may be implemented as a MPEG-2 transport processor) to a signal having a DIRECTV and/or a DVB (Digital Video Broadcasting) STB (Set Top Box) compatible signal. More specifically, the modulator may be implemented as a DVB encoder/modulator to ensure that the signal may be of a DIRECTV and/or a DVB STB compatible signal.

Before being provided to the legacy STB, a DAC is operable to convert this signal to an analog signal having an IF (Intermediate Frequency) signal. For example, this IF signal may have a frequency of approximately 70 MHz (Mega-Hertz). An up-converter functional block is operable to up-convert this IF signal to an L-band signal (having a frequency in the range of 950 MHz to 2150 MHz) using a fixed oscillator. It is noted that this up-conversion of frequency may be integrated within a single chip solution. Alternatively, it may be performed off chip.

In addition, the satellite receiver and the modulator are communicatively coupled to a microcontroller (or a state machine) that is operable to coordinate the communication and control of the STB and an LNB (Low Noise Block Converter). The LNB is a device at the focal point of a satellite dish that gathers the signal reflected by the dish to the system's low-noise block amplifier. Communicatively coupled to the microcontroller (or a state machine) are two transceivers. These transceivers perform the necessary communication and control interfacing with the LNB and the STB, respectively. If desired, these transceivers may be implemented as DiSEqC (Digital Satellite Equipment Control: DiSEgC™— hereinafter referred to as DiSEqC) 2.0 transceivers. DiSEqC is an OPEN STANDARD with additions controlled by industry agreement. The DiSEqC system is a communication bus between satellite receivers and satellite peripheral equipment, using only the existing coaxial cable. DiSEqC is a common standard that has gained a great deal of acceptance for use within consumer satellite installations to replace all conventional analogue (voltage, tone or pulse width) switching and all other control wiring.

The microcontroller (or a state machine) is also operable to include a certain amount of code that the transcoder employs at power up of the device's configuration settings including voltage levels, sequencing, and/or other start-up requirement settings. In addition, the microcontroller (or a state machine) is implemented to direct and coordinate the communication between the STB and the LNB. Also, the microcontroller may be configured to perform other functions such as configuring the transport processor, the PID filter, the receiver to receive a certain type of input signal, and/or the modulator/encoder to select the appropriate signal type for the output.

In addition, the microcontroller (or a state machine) directs all of the specifications when the STB is trying to tune to a particular channel. The microcontroller (or a state machine) may direct the acquisition of the satellite receiver. In general, the microcontroller (or a state machine) governs the communication between the STB, the satellite receiver, and (when necessary) the LNB. In addition, the microcontroller (or a state machine) directs that the transcoder performs the appropriate transformation of the signal provided to the transcoder (e.g., being of a $1^{st}$ signal type) and outputting a signal of a $2^{nd}$ signal type.

It is noted that all of the functional blocks described within this embodiment may be implemented within a single integrated circuit design. Alternatively, the CMOS tuner may be implemented as one integrated circuit, and the remainder of the functional blocks may be within a single integrated circuit design. In even another embodiment, the CMOS tuner may be implemented as one integrated circuit, and the remainder of the functional blocks (except the up-conversion to the L-band before providing the output signal to the STB) may be within a single integrated circuit design, and this up-conversion may be implemented off-chip.

Figure 10:
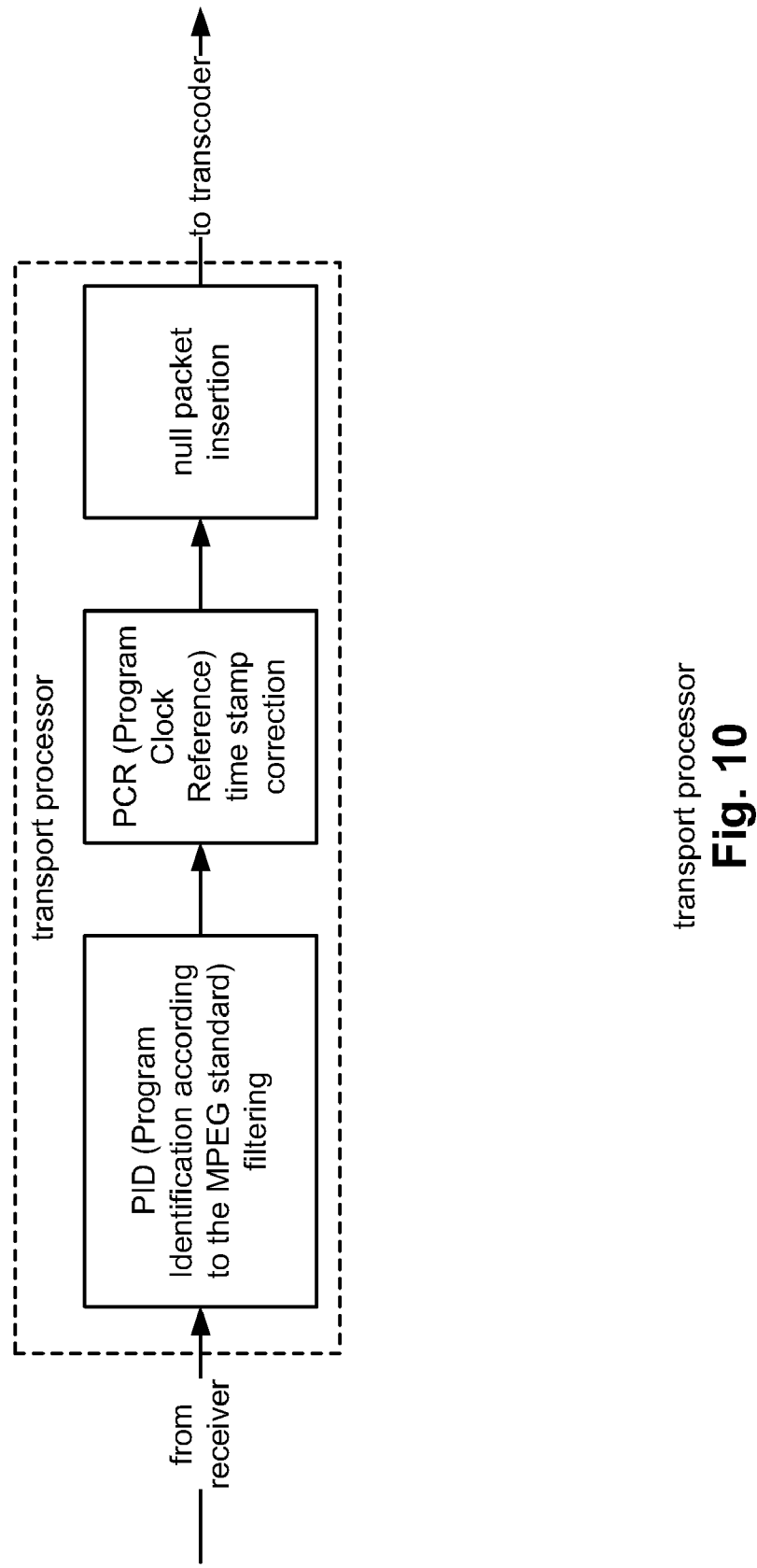
FIG. 10 is a diagram illustrating an embodiment of a transport processor that is built according to the invention.

FIG. 10 is a diagram illustrating an embodiment of a transport processor that is built according to the invention. Again, it is noted that the use of a transport processor interposed between a receiver and a transcoder, built according to the invention, is an option—it is not needed in all embodiments.

In this embodiment, the transport processor includes three different functional blocks. A PID (Program Identification according to the MPEG standard) filtering functional block is operable to throw away data in the received signal that is not desired (e.g., audio and/or video programs that are not being selected). A PCR (Program Clock Reference) time stamp correction functional block is operable to keep the time base constant. In addition, a null packet insertion functional block is operable to insert null packets to ensure that the data rate (e.g., in Mbps (Mega-bits per second)) is maintained at the level for which the communication system is designed. For example, in the MPEG-2 transport stream context, when the data rate of the MPEG-2 transport stream is less than the expected value, then null packets are inserted to bring the data rate up to that expected value.

It is noted that this embodiment is just one possible embodiment of how the transport processor may be implemented. Other embodiments of transport processors may be employed without departing from the scope and spirit of the invention.

Figure 11:
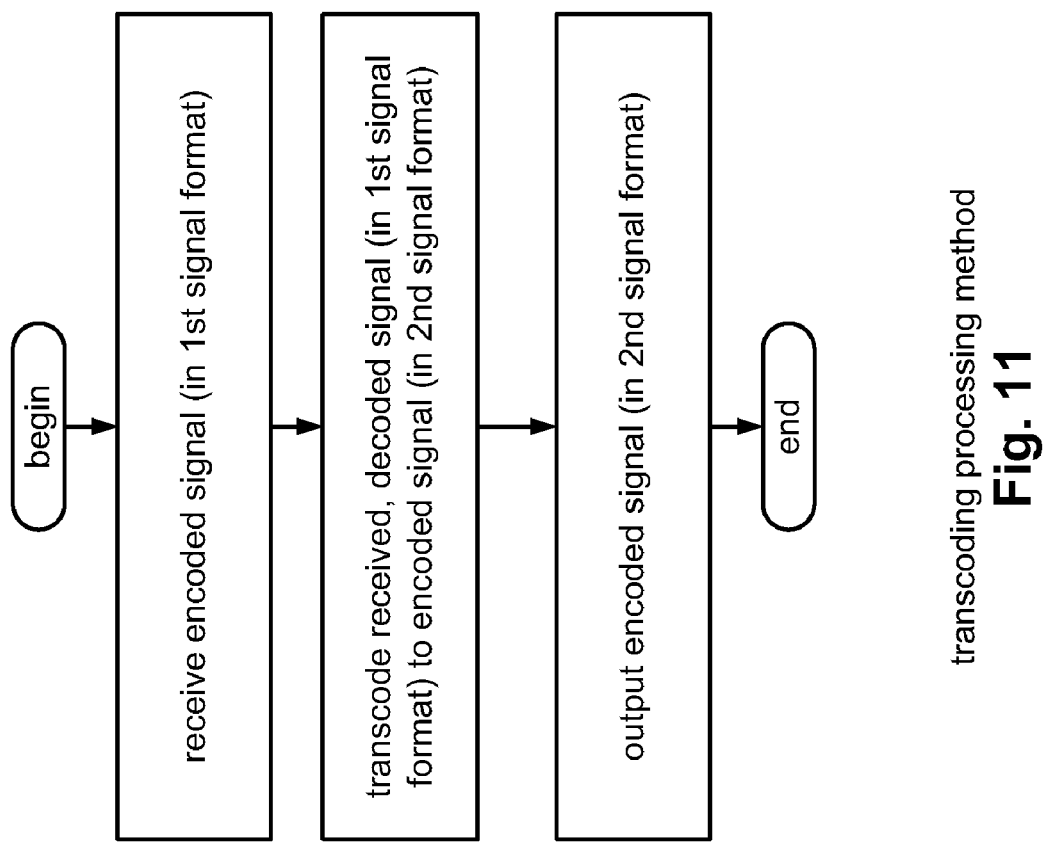
FIG. 11 is a flowchart illustrating an embodiment of a transcoding processing method that is performed according to the invention.

FIG. 11 is a flowchart illustrating an embodiment of a transcoding processing method that is performed according to the invention. Initially, an encoded signal (in $1^{st}$ signal format) is received. It is noted that this $1^{st}$ signal format (or $1^{st}$ signal type) may be viewed as being any one or more parameter of a signal including modulation type, code rate, symbol rate, data rate, and/or other parameter.

After this first signal is decoded, this decoded signal is then transcoded from its $1^{st}$ signal format to into another, encoded signal having a $2^{nd}$ signal format. Again, it is noted that this $2^{nd}$ signal format (or $2^{nd}$ signal type) may be viewed as being any one or more parameter of a signal including modulation type, code rate, symbol rate, data rate, and/or other parameter. Ultimately, the encoded signal having the $2^{nd}$ signal format is then provided as output.

Figure 12:
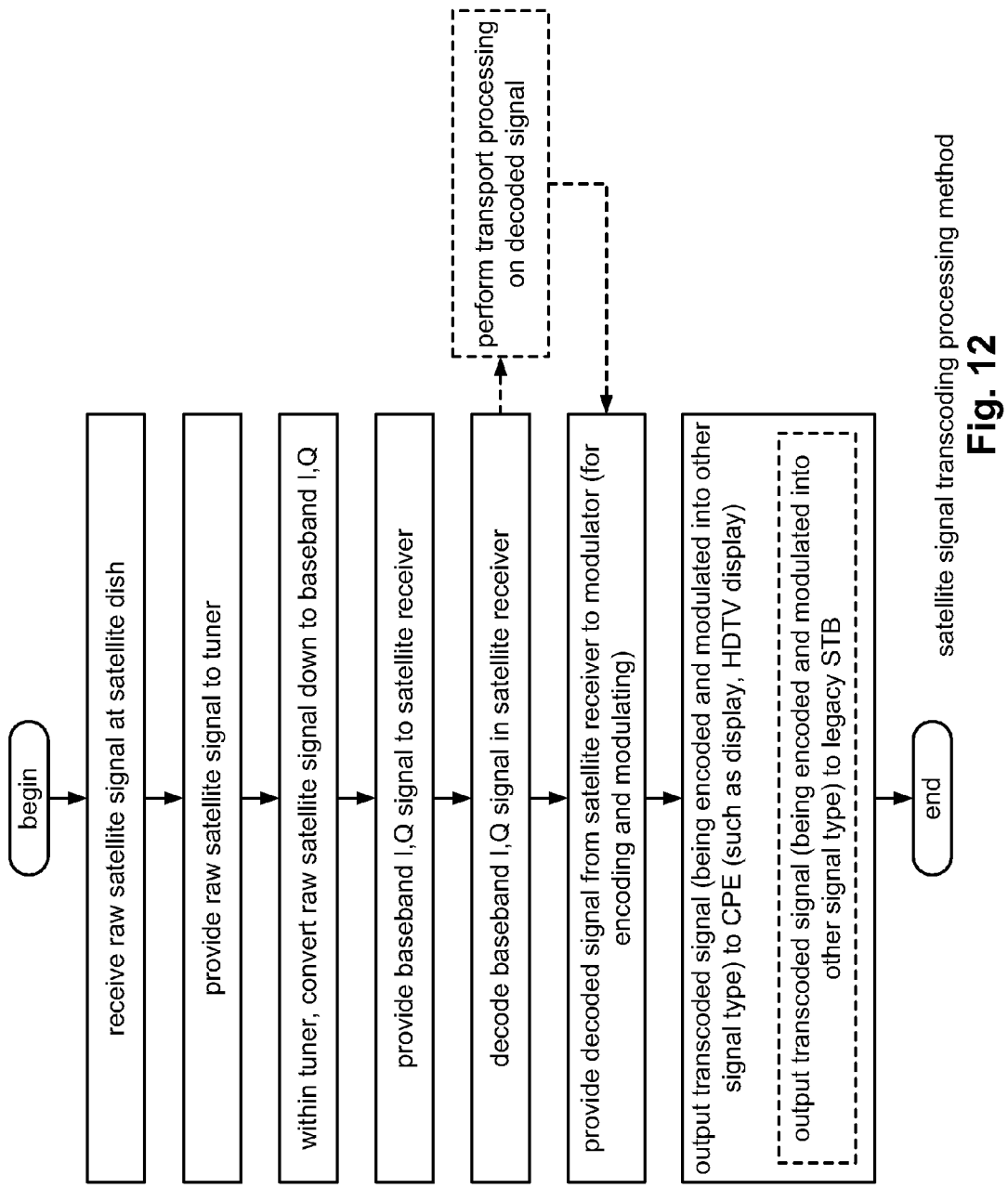
FIG. 12 is a flowchart illustrating an embodiment of a satellite signal transcoding processing method that is performed according to the invention.

FIG. 12 is a flowchart illustrating an embodiment of a satellite signal transcoding processing method that is performed according to the invention. Initially, a raw satellite signal of a $1^{st}$ type is received at satellite dish. Then, the raw satellite signal is provided to a tuner. Within the tuner, the raw satellite signal is converted down to baseband I, Q. This baseband I, Q signal is then provided to a satellite receiver. The satellite receiver then decodes the baseband I, Q signal. If desired, in certain embodiments, transport processing is performed on the decoded signal.

Then, the decoded signal is provided from the satellite receiver to a modulator (for encoding and modulating). The transcoding performs the transformation of the signal of a $1^{st}$ signal type to a signal of a $2^{nd}$ signal type. The transcoded signal may then be applied to a legacy STB. In one instance, this transcoded signal (being encoded and modulated into another signal type) may ultimately be output to a CPE (such as a display, an HDTV display, or other such devices).

It is noted that either of the methods described within the FIG. 11 and the FIG. 12 may be implemented within several of the various functional block type embodiments describe herein.

In some embodiments, various aspects of the invention can be found in a transcoder. The transcoder includes an input that provides a signal to a transcoder functional block and an output that transmits a transcoded signal from the transcoder functional block. More specifically, in this embodiment, the input receives a first signal having a first signal type from a first functional block. This first functional block may be another functional block within a common integrated circuit in which the transcoder functional block is implemented. Alternatively, this first functional block may be another device to which the transcoder is communicatively coupled thereto. Alternatively, this first functional block may be another integrated circuit within a single device in which the transcoder is implemented, such as a receiver and/or a decoder. The transcoder functional block transforms the first signal having the first signal type thereby generating a second signal having a second signal type. The output transmits the second signal having the second signal type to a second functional block.

This second functional block also may be implemented in any number of different ways (e.g., another functional block within the same integrated circuit, another device, another integrated circuit within a common device, among other ways of implementing the second functional block). The first signal type may be characterized in a number of different ways according to one or more parameters. For example, the first signal type may include one or more of a first modulation, a first code rate, a first symbol rate, and/or a first data rate. Similarly, the second signal type may include one or more of a second modulation, a second code rate, a second symbol rate, and/or a second data rate. The transcoder functional block is operable to transform any one or more of these signal parameters from one type to another type.

One example of the transformation of the type of the first signal type to the second signal type may be described as follows: the first signal type includes an 8 PSK (Phase Shift Keying) modulation type, a code rate of ⅔, a symbol rate of approximately 21.5 Msps (Mega-symbols per second), and a data rate of approximately 41 Mbps (Mega-bits per second), and the second signal type includes a QPSK (Quadrature Phase Shift Keying) modulation type, a code rate of ⅞, a symbol rate of approximately 20 Msps, and a data rate of approximately 32.25 Mbps. It is noted here that this is just one of the many possible embodiments of how the invention may be implemented, and other variations may be implemented without departing from the scope and spirit of the invention.

In certain embodiments, the transcoder functional block is implemented within an integrated circuit. Also, the first functional block and the second functional block may also be implemented as functional blocks within the same integrated circuit. In one particular embodiment, the first functional block is a satellite receiver that is operable to decode the first signal having the first signal type, and the second functional block is a modulator and a DAC (Digital to Analog Converter) that is operable to transform the second signal having the second signal type from a digital signal into an analog signal. In another embodiment, the first functional block includes a transport processor that includes a PID (Program Identification according to the MPEG standard) filtering functional block, a PCR (Program Clock Reference) time stamp correction functional block, and a null packet insertion functional block. In this instance, the PID filtering functional block is operable to throw away data in the first signal having the first signal type, the PCR time stamp correction functional block is operable to keep a time base of the second signal having the second signal type constant, the null packet insertion functional block is operable to insert null packets into the first signal having the first signal type thereby ensuring a constant data rate of the first signal having the first signal type, and the second functional block includes a DAC that is operable to transform the second signal having the second signal type from a digital signal into an analog signal. The transport processor may be implemented as an MPEG-2 (Motion Picture Expert Group, level 2) transport processor.

The transcoder itself may also be implemented in a number of different ways. For example, the transcoder may be implemented as a one to many transcoder, a uni-directional transcoder, or a bi-directional transcoder. The one to many transcoder is operable to transform the first signal having the first signal type thereby generating the second signal having the second signal type and a third signal having the third signal type. The uni-directional transcoder is operable to transform the first signal having the first signal type thereby generating the second signal having the second signal type when communicating in a first direction with respect to the transcoder. The bi-directional transcoder is operable to transform the first signal having the first signal type thereby generating the second signal having the second signal type when information is communicated in a first direction with respect to the transcoder, and the bi-directional transcoder is also operable to transform the fourth signal having the fourth signal type thereby generating the fifth signal having the firth signal type when information is communicated in a second direction with respect to the transcoder.

Moreover, the transcoder may be implemented within at least one of a satellite communication system, a HDTV (High Definition Television) communication system, a cable television system, and a cable modem communication system. In even other embodiments, the transcoder functional block includes a DVB (Digital Video Broadcasting) encoder/modulator to ensure that the second signal having the second signal type is a DVB STB (Set Top Box) compatible signal.

Within another embodiment, a satellite signal, being a turbo coded signal and having an 8 PSK (Phase Shift Keying) modulation type, that is provided to a CMOS (Complementary Metal Oxide Semiconductor) satellite tuner that is operable to perform tuning and down-converting of the satellite signal to generate an analog baseband signal having I, Q (In-phase, Quadrature) components. In this embodiment, the first functional block is an 8 PSK (Phase Shift Keying) turbo code receiver. The analog baseband signal is provided to the 8 PSK turbo code receiver that is operable to decode the analog baseband signal thereby generating a decoded baseband signal. The analog baseband signal is the first signal having the first signal type that is provided to the transcoder functional block. The transcoder functional block is a DVB (Digital Video Broadcasting) encoder/modulator that is operable to transform the first signal having the first signal type, which is the analog baseband signal, thereby generating the second signal having the second signal type. The second functional block includes a DAC (Digital to Analog Converter) that is operable to transform the second signal having the second signal type from a digital signal into an analog signal that is an IF (Intermediate Frequency) signal that is within the RF (Radio Frequency) spectrum. In some embodiments, this IF signal may be a signal having a frequency of approximately 70 MHz (Mega-Hertz). This embodiment also includes an up-converter functional block that is operable to up-convert the IF signal to an L-band signal having a frequency in a range of 950 MHz to 2150 MHz, and the L-band signal is a DVB STB (Set Top Box) compatible signal. Another variation of this embodiment includes a microcontroller or a state machine that is operable to coordinate the communication and control of a STB, to which the transcoder is communicatively coupled, and an LNB (Low Noise Block Converter) of a satellite dish to which the transcoder is also communicatively coupled. Also, a first transceiver may be implemented to interface the microcontroller or a state machine to the LNB, and a second transceiver may be implemented to interface the microcontroller or a state machine to the STB. Each of the first transceiver and the second transceiver may be implemented as a DiSEqC (Digital Satellite Equipment Control) transceiver.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
   a transcoder functional block for processing a first signal having a first signal type thereby generating a second signal having a second signal type; and
   a microcontroller or a state machine, communicatively coupled to the transcoder functional block, for directing operation of the transcoder functional block in processing the first signal thereby generating the second signal;
   a first DiSEqC (Digital Satellite Equipment Control) transceiver for interfacing the microcontroller or the state machine to an LNB (Low Noise Block Converter) of a satellite dish; and
   a second DiSEqC transceiver for interfacing the microcontroller or the state machine to a Set Top Box (STB); and wherein:
   the first signal type includes a first modulation, a first code rate, a first symbol rate, and a first data rate;
   the second signal type includes a second modulation, a second code rate, a second symbol rate, and a second data rate; and
   the microcontroller or the state machine being operative to coordinate communication and control of the STB and the LNB.

2. The apparatus of claim 1, wherein the transcoder functional block further comprising:
   a satellite receiver for decoding the first signal having the first signal type, wherein the first signal including information encoded by one of a plurality of codes, the satellite receiver including a plurality of decoding functionalities for respectively decoding in accordance with each of the plurality of code types, and the satellite receiver adaptively employing one of the plurality of decoding functionalities that respectively corresponds to the one of the plurality of codes for decoding the first signal;
   a modulator, connected to the satellite receiver, for encoding and modulating decoded output from the satellite receiver; and
   a DAC (Digital to Analog Converter), connected to the modulator, for transforming the second signal having the second signal type from a digital signal into an analog signal.

3. The apparatus of claim 2, wherein:
   the transcoder functional block being implemented within an integrated circuit;
   the transcoder functional block including a first functional block and a second functional block; and the first functional block and the second functional block being functional blocks within the integrated circuit.

4. The apparatus of claim 2, wherein:
the transcoder functional block being implemented within an integrated circuit;
the first functional block being the satellite receiver; and
the second functional block including the modulator and the DAC.

5. The apparatus of claim 1, wherein:
the apparatus being implemented within at least one of a satellite communication system, an HDTV (High Definition Television) communication system, a cable television system, and a cable modem communication system.

6. An apparatus, comprising:
a transcoder functional block for processing a first signal having a first signal type thereby generating a second signal having a second signal type; and
a microcontroller or a state machine, communicatively coupled to the transcoder functional block, for directing operation of the transcoder functional block in processing the first signal thereby generating the second signal; and wherein:
the first signal type includes a first modulation, a first code rate, a first symbol rate, and a first data rate; and
the second signal type includes a second modulation, a second code rate, a second symbol rate, and a second data rate.

7. The apparatus of claim 6, wherein the transcoder functional block further comprising:
a satellite receiver for decoding the first signal having the first signal type, wherein the first signal including information encoded by one of a plurality of codes, the satellite receiver including a plurality of decoding functionalities for respectively decoding in accordance with each of the plurality of code types, and the satellite receiver adaptively employing one of the plurality of decoding functionalities that respectively corresponds to the one of the plurality of codes for decoding the first signal;
a modulator, connected to the satellite receiver, for encoding and modulating decoded output from the satellite receiver; and
a DAC (Digital to Analog Converter), connected to the modulator, for transforming the second signal having the second signal type from a digital signal into an analog signal.

8. The apparatus of claim 7, wherein:
the transcoder functional block being implemented within an integrated circuit;
the transcoder functional block including a first functional block and a second functional block; and
the first functional block and the second functional block being functional blocks within the integrated circuit.

9. The apparatus of claim 7, wherein:
the transcoder functional block being implemented within an integrated circuit;
the first functional block being the satellite receiver; and
the second functional block including the modulator and the DAC.

10. The apparatus of claim 6, wherein the transcoder functional block further comprising:
a satellite receiver for adaptively processing the first signal based on the first signal type; and wherein:
the first signal type being a turbo code signal type or an LDPC (Low Density Parity Check) code signal type.

11. The apparatus of claim 10, wherein:
the first signal type being the turbo code signal type;
the first signal type including an 8 PSK (Phase Shift Keying) modulation type, a code rate of ⅔, a symbol rate of approximately 21.5 Msps (Mega-symbols per second), and a data rate of approximately 41 Mbps (Mega-bits per second); and
the second signal type including a QPSK (Quadrature Phase Shift Keying) modulation type, a code rate of ⅞, a symbol rate of approximately 20 Msps, and a data rate of approximately 32.25 Mbps.

12. The apparatus of claim 10, wherein:
the first signal type being the LDPC code signal type;
the first signal type including an 8 PSK (Phase Shift Keying) modulation type, a code rate of ⅔, a symbol rate of approximately 20 Msps (Mega-symbols per second), and a data rate of approximately 40 Mbps (Mega-bits per second); and
the second signal type including a QPSK (Quadrature Phase Shift Keying) modulation type, a code rate of 6/7, a symbol rate of approximately 20 Msps, and a data rate of approximately 30.5 Mbps.

13. The apparatus of claim 6, wherein:
the microcontroller or the state machine being operative to coordinate communication and control of a Set Top Box (STB) and an LNB (Low Noise Block Converter) of a satellite dish that are both respectively communicatively coupled to the transcoder functional block.

14. The apparatus of claim 13, further comprising:
a first DiSEqC (Digital Satellite Equipment Control) transceiver for interfacing the microcontroller or the state machine to the LNB; and
a second DiSEqC transceiver for interfacing the microcontroller or the state machine to the STB.

15. The apparatus of claim 6, wherein:
the transcoder functional block including a DVB (Digital Video Broadcasting) encoder/modulator for ensuring that the second signal having the second signal type is a DVB STB (Set Top Box) compatible signal.

16. The apparatus of claim 6, wherein:
the apparatus being implemented within at least one of a satellite communication system, an HDTV (High Definition Television) communication system, a cable television system, and a cable modem communication system.

17. A method, comprising:
operating a transcoder functional block for processing a first signal having a first signal type thereby generating a second signal having a second signal type; and
operating a microcontroller or a state machine, communicatively coupled to the transcoder functional block, for directing operation of the transcoder functional block in processing the first signal thereby generating the second signal; and wherein:
the first signal type includes a first modulation, a first code rate, a first symbol rate, and a first data rate; and
the second signal type includes a second modulation, a second code rate, a second symbol rate, and a second data rate.

18. The method of claim 17, further comprising:
operating a satellite receiver, implemented within the transcoder functional block, for adaptively processing the first signal based on the first signal type, wherein the first signal type being a turbo code signal type or an LDPC (Low Density Parity Check) code signal type.

19. The method of claim 18, wherein:

the first signal type being the turbo code signal type;

the first signal type including an 8 PSK (Phase Shift Keying) modulation type, a code rate of ⅔, a symbol rate of approximately 21.5 Msps (Mega-symbols per second), and a data rate of approximately 41 Mbps (Mega-bits per second); and the second signal type including a QPSK (Quadrature Phase Shift Keying) modulation type, a code rate of ⅞, a symbol rate of approximately 20 Msps, and a data rate of approximately 32.25 Mbps.

20. The method of claim 18, wherein:

the first signal type being the LDPC code signal type;

the first signal type including an 8 PSK (Phase Shift Keying) modulation type, a code rate of ⅔, a symbol rate of approximately 20 Msps (Mega-symbols per second), and a data rate of approximately 40 Mbps (Mega-bits per second); and the second signal type including a QPSK (Quadrature Phase Shift Keying) modulation type, a code rate of 6/7, a symbol rate of approximately 20 Msps, and a data rate of approximately 30.5 Mbps.

* * * * *